United States Patent
Battagin et al.

(10) Patent No.: US 7,664,804 B2
(45) Date of Patent: Feb. 16, 2010

(54) METHOD, SYSTEM, AND APPARATUS FOR EXPOSING WORKBOOK RANGES AS DATA SOURCES

(75) Inventors: Daniel C. Battagin, Redmond, WA (US); Liviu Asnash, Redmond, WA (US); Amir Netz, Bellevue, WA (US); Cristian Petculescu, Redmond, WA (US); Eran Megiddo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 10/858,175

(22) Filed: Jun. 1, 2004

(65) Prior Publication Data

US 2005/0267853 A1 Dec. 1, 2005

(51) Int. Cl.
*G06F 7/00* (2006.01)
*G06F 17/00* (2006.01)
*G06F 17/30* (2006.01)

(52) U.S. Cl. .............. 707/804; 707/600; 707/758; 707/803; 707/802; 707/705; 707/790

(58) Field of Classification Search ............. 707/4, 707/100, 101, 102
See application file for complete search history.

(56) References Cited

U.S. PATENT DOCUMENTS

| | | |
|---|---|---|
| 5,437,006 A | 7/1995 | Turski |
| 5,870,522 A | 2/1999 | Strolle et al. |
| 5,890,174 A | 3/1999 | Khanna et al. |
| 5,893,123 A | 4/1999 | Tuinenga |
| 5,933,818 A | 8/1999 | Kasravi et al. ............. 706/12 |
| 5,937,406 A | 8/1999 | Balabine et al. |
| 5,974,416 A | 10/1999 | Anand et al. |
| 6,012,057 A * | 1/2000 | Mayer et al. ................. 707/6 |
| 6,055,548 A | 4/2000 | Comer et al. |
| 6,094,651 A | 7/2000 | Agrawal et al. |
| 6,157,934 A | 12/2000 | Khan et al. |
| 6,269,377 B1 | 7/2001 | Collie et al. |
| 6,282,548 B1 | 8/2001 | Burner et al. |
| 6,317,750 B1 * | 11/2001 | Tortolani et al. ............. 707/4 |
| 6,411,313 B1 * | 6/2002 | Conlon et al. ............. 715/769 |

(Continued)

FOREIGN PATENT DOCUMENTS

EP 9 997 834 5/2000

(Continued)

OTHER PUBLICATIONS

4tops.com, "Excel Import Assistant for Microsoft Access" Apr. 2003, www.4tops.com.*

(Continued)

*Primary Examiner*—Apu M Mofiz
*Assistant Examiner*—Brent Stace
(74) *Attorney, Agent, or Firm*—Merchant & Gould P.C.

(57) ABSTRACT

A method, system, and apparatus are provided for exposing and utilizing workbook ranges as server data sources. The system includes a client computer capable of executing a spreadsheet application program for creating a workbook including a range that includes data objects. The workbook may be published to a server computer where the specified data objects are exposed as server data sources. The server computer allows client applications to discover and connect to the data objects contained within the workbook as server data sources.

11 Claims, 5 Drawing Sheets

U.S. PATENT DOCUMENTS

| | | | |
|---|---|---|---|
| 6,430,584 | B1 | 8/2002 | Comer et al. |
| 6,446,059 | B1 | 9/2002 | Berger et al. |
| 6,456,999 | B1 | 9/2002 | Netz |
| 6,473,750 | B1 | 10/2002 | Petculescu et al. |
| 6,477,536 | B1 | 11/2002 | Pasumansky et al. |
| 6,493,718 | B1 | 12/2002 | Petculescu et al. |
| 6,532,458 | B1 | 3/2003 | Chaudhuri et al. |
| 6,549,907 | B1 | 4/2003 | Fayyad et al. |
| 6,604,135 | B1 * | 8/2003 | Rogers et al. ............... 709/217 |
| 6,631,497 | B1 | 10/2003 | Jamshidi et al. |
| 6,632,249 | B2 | 10/2003 | Pollock |
| 6,684,206 | B2 | 1/2004 | Chen et al. |
| 6,701,485 | B1 | 3/2004 | Igra et al. |
| 6,898,603 | B1 * | 5/2005 | Petculescu et al. .......... 707/101 |
| 6,920,443 | B1 | 7/2005 | Cesare et al. |
| 7,032,030 | B1 | 4/2006 | Codignotto |
| 7,240,052 | B2 * | 7/2007 | Sidlosky et al. ................. 707/3 |
| 7,299,223 | B2 * | 11/2007 | Namait et al. ................... 707/4 |
| 7,460,713 | B2 | 12/2008 | Lapstun et al. |
| 2002/0010743 | A1 | 1/2002 | Ryan et al. |
| 2002/0013786 | A1 | 1/2002 | Machalek |
| 2002/0059261 | A1 | 5/2002 | Pollock |
| 2002/0095399 | A1 | 7/2002 | Devine et al. |
| 2002/0169799 | A1 * | 11/2002 | Voshell ....................... 707/503 |
| 2002/0188629 | A1 | 12/2002 | Burfoot |
| 2003/0110191 | A1 | 6/2003 | Handsaker et al. |
| 2003/0149934 | A1 * | 8/2003 | Worden ...................... 715/513 |
| 2003/0195762 | A1 | 10/2003 | Gleason et al. |
| 2004/0060001 | A1 | 3/2004 | Coffen et al. |
| 2004/0103365 | A1 | 5/2004 | Cox |
| 2004/0103366 | A1 | 5/2004 | Peyton-Jones et al. |
| 2004/0133567 | A1 * | 7/2004 | Witkowski et al. ............. 707/3 |
| 2004/0133568 | A1 * | 7/2004 | Witkowski et al. ............. 707/3 |
| 2004/0237029 | A1 | 11/2004 | Medicke et al. |
| 2005/0039113 | A1 * | 2/2005 | Balducci et al. ............ 715/503 |
| 2005/0039114 | A1 * | 2/2005 | Naimat et al. ............... 715/503 |
| 2006/0024653 | A1 | 2/2006 | Battagin et al. |
| 2006/0069603 | A1 | 3/2006 | Williams et al. |
| 2006/0069617 | A1 | 3/2006 | Milener et al. |
| 2006/0112123 | A1 * | 5/2006 | Clark et al. ................. 707/101 |
| 2009/0235154 | A1 | 9/2009 | Khen et al. |

FOREIGN PATENT DOCUMENTS

| | | |
|---|---|---|
| EP | 1 605 367 | 12/2005 |

OTHER PUBLICATIONS

U.S. Office Action dated Dec. 19, 2007 cited in U.S. Appl. No. 10/903,568.

ExcelTip.com, "Export data from Excel to Access (DAO) using VBA in Microsoft Excel," 05.2003, pp. 1-2.

Andrew Witkowski et al., "Spreadsheets in RDBMS for OLAP," 06.2003, ACM SIGMOD, pp. 52-63.

U.S. Appl. No. 10/903,568, filed Jul. 30, 2004 entitled "Method, System, and Apparatus for Exposing Workbooks as Data Sources".

European Search Report dated Jun. 30, 2006 cited in Application No. 05104477.4-2201.

Lakshmanan et al., "On Querying Spreadsheets," Data Engineering, 1998, Proceedings, 14$^{th}$ International Conference, pp. 134-141.

De Paoli et al., "Requirements for a Layered Software Architecture Supporting Cooperative Multi-Layer Interaction," Software Engineering, 1996, Proceedings of the 18$^{th}$ International Conference, pp. 408-417.

U.S. Office Action dated Nov. 2, 2006 cited in U.S. Appl. No. 10/903,568.

U.S. Final Office Action dated May 4, 2007 cited in U.S. Appl. No. 10/903,568.

U.S. Appl. No. 10/903,781, filed Jul. 30, 2004 entitled, "Method, System, and Apparatus for Providing Access to Workboook Models Through Remote Function Calls"; (60001.0337US01); 30 pgs.

European Search Report mailed Aug. 6, 2007 cited in EP Application No. 0510620.9-1243; (60001.0337EP01); 3 pgs.

European Official Communication dated Nov. 5, 2007 cited in EP Application No. 05 104 620.9-1243; (60001.0337EP01); 5 pgs.

U.S. Office Action dated Oct. 31, 2007 cited in U.S. Appl. No. 10/903,781; (60001.0337US01); 13 pgs.

U.S. Final Office Action dated May 12, 2008 cited in U.S. Appl. No. 10/903,781; (60001.0337US01); 14 pgs.

U.S. Final Office Action dated Jun. 6, 2008 cited in U.S. Appl. No. 10/903,568; (60001.0336US01); 25 pgs.

U.S. Office Action dated Nov. 26, 2008 cited in U.S. Appl. No. 10/903,781; (60001.0337US01); 16 pgs.

U.S. Office Action dated Dec. 19, 2008 cited in U.S. Appl. No. 10/903,568; (60001.0336US01); 29 pgs.

Chinese First Office Action dated Mar. 14, 2008 cited in Application No. 200510082420.X; 17 pgs.

Chinese Second Office Action dated Nov. 21, 2008 cited in Application No. 200510082420.X; 7 pgs.

Chinese First Office Action dated Feb. 13, 2009 cited in Application No. 200510082407.4 (0337cc01) pp. 1-11.

Chinese Third Office Action dated Mar. 13, 2009 cited in Application No. 200510082420.X (0336cc01), pp. 1-7.

U.S. Office Action mailed May 20, 2009, in U.S. Appl. No. 11/599,598.

European Examination Report mailed Mar. 25, 2009 in 07717882.0-1527/1977340.

European Examination Report mailed Apr. 1, 2009 in 07717837.4-1527/1977339.

U.S. Final Office Action dated Aug. 4, 2009 cited in U.S. Appl. No. 10/903,781, pp. 1-20.

Chinese Fourth Office Action dated Jul. 10, 2009 cited in Application No. 200510082420.X (0336cc01), pp. 1-7.

Mexican Office Action dated Jan. 22, 2009 cited in Application No. PA/a/2005/005799 (0337mx01), pp. 1-4.

European Official Communication dated Nov. 26, 2007 cited in EP Application No. 05 104 620.9-1243.

Erik Hatcher, "Remote scripting using a servlet," Jan. 2, 2001, http://www.ibm.com/developerworks/web/library/wa-resc/, 7 pgs. (0337ep01).

* cited by examiner

METHOD, SYSTEM, AND APPARATUS FOR EXPOSING WORKBOOK RANGES AS DATA SOURCES

BACKGROUND OF THE INVENTION

When building workbooks, users of spreadsheet application programs often utilize data from a number of different sources. For instance, when creating a workbook within a spreadsheet application program, a user may import data from another workbook, may enter data into the workbook manually, or may obtain data by executing queries on a relational database or on an on-line analytical processing ("OLAP") cube. Once the data has been entered from any of these sources, a user typically arranges the data in the desired configuration within the workbook. At the end of this process, the user has created a workbook that includes a tabular range of data upon which meaningful numerical analysis may be performed.

In order for other users to access the contents of the workbook, copies of the workbook or portions of it may be made. For instance, in many scenarios the workbook is sent to other users via an electronic mail ("e-mail") message. The users that receive the workbook can then perform analysis on the workbook or add the data contained in the workbook to another workbook. Alternatively, the workbook may be stored on a file share where multiple users can access the contents of the workbook. In order to share the contents of the workbook, ranges of data may also be copied and pasted into other documents.

Although these traditional methods for sharing a workbook allow multiple users to access the contents of a workbook, these methods are not without their drawbacks. First, it is very difficult to administer multiple copies of a workbook that may be duplicated many times across multiple computers and network domains. In particular, it is very difficult for a system administrator to ensure that the workbook is secure and that it is frequently backed up. Moreover, in the case of a file share, it may be very difficult for multiple users to simultaneously access the workbook. For example, if the author of the original workbook needs to update it, then it is extremely difficult to track all the users that use it and have them update their copies. In many cases, the spreadsheet client application locks the workbook when it is opened by one user, thereby preventing others from accessing the file. Additionally, identical functions may be performed on different copies of the workbook, thereby causing duplication of effort and reducing productivity.

It is with respect to these considerations and others that the various embodiments of the present invention have been made.

BRIEF SUMMARY OF THE INVENTION

In accordance with the present invention, the above and other problems are solved by a method, system, and apparatus for exposing workbook ranges as data sources. By exposing ranges within a workbook as server data sources, structured access may be easily had to the contents of the workbook by any application program capable of connecting to and querying a server data source. Moreover, because workbook ranges are exposed as server data sources when the workbook is published, any user capable of operating a spreadsheet application program can easily create enterprise level data sources.

According to one aspect of the invention, a system is provided for exposing the contents of a workbook as a server data source and for utilizing the server data source. The system includes a client computer capable of executing a spreadsheet application program for creating a workbook. The workbook may include one or more ranges that include data objects. As defined herein, a data object includes any object within a worksheet that is utilized to store data. For instance, data objects may include, but are not limited to, an arbitrary range of cells, pivot tables, data exploration objects ("DOEs"), lists, databases, and query tables.

The spreadsheet application program may also be operative to generate metadata for each of the data objects when the worksheet is authored. The metadata may be saved with the worksheet. The metadata may be utilized by a server computer when receiving and responding to requests to access the data objects within the workbook as server data sources. Creation of metadata for the data objects may be performed in an automated fashion by the spreadsheet application program when the data is created, when the data is published, or in response to a user request to generate the metadata. A facility may also be provided for allowing a user to edit the metadata.

The spreadsheet application program is further operative to publish a workbook to a server computer. When a workbook is published to a server computer, a user may specify that some, none, or all of the data objects within a workbook be exposed as server data sources. The workbook is then transmitted to the server computer where the specified data sources are exposed as server data sources.

According to aspects of the invention, the system also includes a server computer operative to execute a server program for exposing data objects within a workbook as server data objects. As used herein, the terms "data source" and "server data source" refer specifically to a database upon which queries may be executed. This definition includes relational databases (such as those that may be built and queried using the Structured Query Language ("SQL")), hierarchical databases, multidimensional databases (such as an OLAP cube), or databases that combine aspects of relational and multi-dimensional databases (such as the Unified Dimensional Model ("UDM")). The definition also includes databases that may be queried via Web services. As also used herein the term "data source query" means a query directed to a data source, such as an SQL query.

Once the workbook data objects have been exposed, client applications may discover and connect to the data objects as server data sources. When a query is issued against a data object as a server data source, the server computer is operative to recalculate the workbook. If the workbook contains a reference to another data source, any data necessary to recalculate the workbook may be retrieved from the data source prior to the recalculation. Once the workbook has been recalculated, the server computer is operative to generate a representation (such as a database representation) of the identified data object. This may include, for instance, generating a temporary database or cube corresponding to the identified data object.

Once the representation has been generated, the server computer is operative to perform the requested query on the representation. The result of the query is then returned to the requesting client application program. In this manner, for instance, a user can easily author a workbook and publish the workbook to a server computer where its data objects may be exposed as server data sources. Other users utilizing database client applications, such as an OLAP client, can then discover the data sources contained in the workbook and issue native queries against the data sources.

The invention may be implemented as a computer process, a computing apparatus, or as an article of manufacture such as a computer program product or computer readable media.

The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
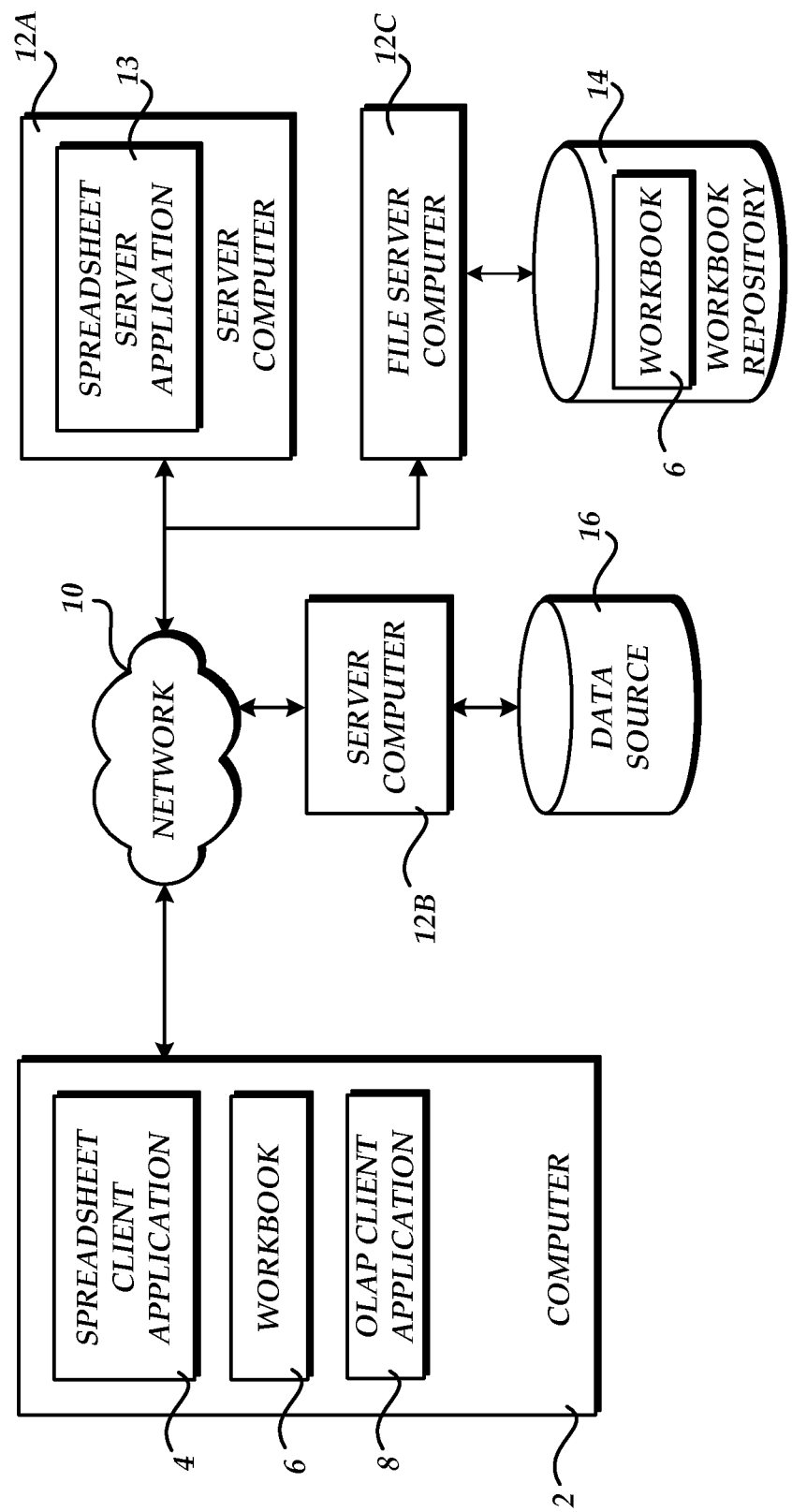
FIG. 1 is a computer network diagram illustrating aspects of several computer systems utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the several embodiments of the invention will be described. As shown in FIG. 1, a network 10 interconnects a client computer 2 and several server computers 12A-12C. It should be appreciated that the network 10 may comprise any type of computing network, including a local area network or a wide area network, such as the Internet. The network 10 provides a medium for enabling communication between the client computer 2, the server computers 12A-12C, and potentially other computer systems connected to or accessible through the network 10.

The client computer 2 comprises a general purpose desktop or laptop computer capable of executing one or more application programs. In particular, according to the various embodiments of the invention, the computer 2 is operative to execute a spreadsheet client application 4. As known to those skilled in the art, the spreadsheet client application program 4 provides functionality for creating budgets, performing financial forecasting, and other finance and numeric-related tasks. In order to provide this functionality, data values may be organized using cells and the relationships between the cells may be defined using formulas. A change to one cell produces changes to related cells. Spreadsheet programs usually provide graphing capabilities for output and a variety of formatting options for text, numeric values, and graph features.

According to embodiments of the invention, the spreadsheet client application 4 may be utilized to create a workbook 6. The workbook 6 is a file that is created by a spreadsheet program that contains one or more worksheets (a worksheet may also be referred to herein as a ("spreadsheet"). A worksheet is a single page organized into rows and columns within the spreadsheet program and appearing on screen and used for constructing a single table.

Worksheets within the workbook 6 may include one or more ranges that include data objects. As defined herein, a data object includes any object within a worksheet that is utilized to store data. For instance, data objects may include, but are not limited to, an arbitrary range of cells, pivot tables, DOEs, lists, databases, and query tables. As will be described more fully herein, each of these data objects may be exposed as a server data source available from the server 12A. Other types of data objects utilized within a workbook may also be exposed as a server data source.

It should be appreciated that, according to one embodiment of the invention, the spreadsheet client application 4 comprises the EXCEL spreadsheet application program from MICROSOFT CORPORATION of Redmond, Wash. It should be appreciated, however, that the various aspects of the invention described herein may be utilized with other spreadsheet application programs from other manufacturers. Moreover, although the inventive aspects described herein are presented in the context of a spreadsheet application program, it should be appreciated that other types of application programs may also be utilized to embody the various aspects of the invention.

According to other embodiments of the invention, the client computer 2 may also be operative to execute an OLAP client application 8. The OLAP client application 8 comprises an application program capable of connecting to, querying, and utilizing data from an OLAP data source. For instance, the OLAP client application 8 may connect to the server computer 12B through the network 10. Through database software executing on the server computer 12B, the OLAP client application 8 may issue queries against the data source 16. The server computer 12B is then operative to receive and respond to the queries from the OLAP client application 8.

As will be described in greater detail below, the OLAP client application 8 may also issue queries against a workbook 6. In order to enable this functionality, the spreadsheet client application 4 may publish the workbook 6 to a repository 14 maintained by a file server computer 12C and accessible to the server computer 12A. The spreadsheet server application 13 executing on the server computer 12A may then parse the workbook 6 for ranges including data objects and expose the data objects as server data sources. The OLAP client application 8 may then connect to the data sources exposed by the spreadsheet server application 12A in the same manner that it would connect to a dedicated OLAP data source, such as that provided by the server computer 12B. It should be appreciated that the spreadsheet client application 4 may act as a consumer of data from a data source in the same manner as the OLAP client application 8. It should also be appreciated that the computer 2 may be operative to execute additional client applications for querying and consuming data from other types of databases. It should further be appreciated that in an alternative embodiment, the functions of the computer 2 described above may be divided among two computing devices. For instance, one computing device may be operative to execute the spreadsheet application 4 for publishing the workbook 6 while the other computing device may be operative to execute client applications for consuming data.

As used herein, the terms "data source" and "server data source" refer specifically to a database upon which queries may be executed. This definition includes relational databases (such as SQL databases), hierarchical databases, multidimensional databases (such as an OLAP cube), or databases that combine aspects of relational and multidimensional databases (such as the UDM). The definition also includes databases that may be queried via Web services. As also used herein the term "data source query" means a query directed to a data source, such as an SQL query.

The spreadsheet server application 13 comprises a server-based application program that may execute without the use of a display screen (headless). The spreadsheet server application 13 is operative to perform many of the functions of the spreadsheet client application 4 on a server computer. For instance, the spreadsheet server application 13 can load and calculate a workbook 6. As will be described herein, the spreadsheet server application 13 also provides functionality for exposing ranges within a workbook 6 to compatible clients via the network 10. Additional details regarding the various functions performed by the spreadsheet client application 4 and the spreadsheet server application 13 will be provided below with respect to FIGS. 2-5.

Figure 2:
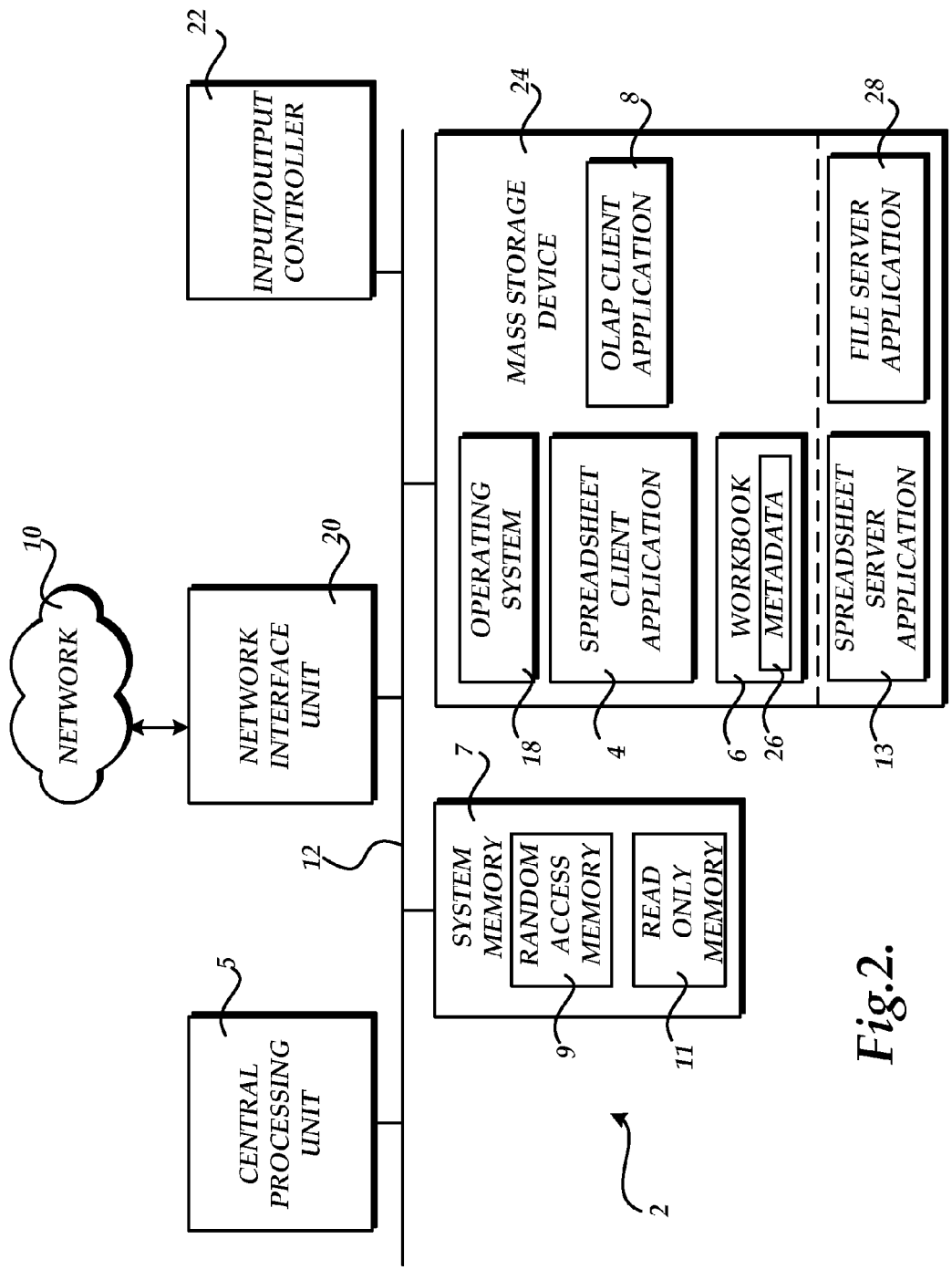
FIG. 2 is a computer system architecture diagram illustrating aspects of a client computer system utilized in and provided by the various embodiments of the invention.

Referring now to FIG. 2, an illustrative computer architecture for a computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 24 for storing an operating system 18, application programs, and other program modules, which will be described in greater detail below.

The mass storage device 24 is connected to the CPU 5 through a mass storage controller (not shown) connected to the bus 12. The mass storage device 24 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 10, such as the Internet. The computer 2 may connect to the network 10 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 24 and RAM 9 of the computer 2, including an operating system 18 suitable for controlling the operation of a networked personal computer, such as the WINDOWS XP operating system from MICROSOFT CORPORATION of Redmond, Wash. The mass storage device 24 and RAM 9 may also store one or more program modules. In particular, the mass storage device 24 and the RAM 9 may store a spreadsheet client application 4 and an OLAP client application 8, as described above. The mass storage device 24 and RAM 9 may also store a workbook 6 created by the spreadsheet client application 4.

According to one embodiment of the invention, the spreadsheet application program 4 is also be operative to generate metadata 26 for each of the data objects contained within a workbook. The metadata 26 may be automatically generated by the spreadsheet client application 4 or authored by hand by a user. The metadata 26 may be stored within the workbook 6 and saved with the workbook. The metadata 26 may be utilized by the server computer 12A when receiving and responding to requests to access the data objects within the workbook as server data sources. As an example, the spreadsheet application program 10 may create metadata 26 for a field in a workbook entitled "ZIP CODE." The metadata 26 may indicate the name of the field and may set a data type for the field as a number. The metadata 26 may also indicate that the default aggregation for the field is a "sum." This process may be performed in an automated fashion by the spreadsheet application program 4 when the data source is created, when the data source is published, or in response to a user request to generate the metadata.

It should be appreciated that, in embodiments of the invention, the spreadsheet client application program 4 is operative to provide a facility for allowing a user to edit the metadata 26 created by the spreadsheet application program 4 for the data objects contained in a workbook 6. For instance, using the above example, a user may deem it inappropriate to generate a sum of zip codes. Accordingly, the user may utilize a facility provided by the spreadsheet client application 4 to edit the metadata 26 to indicate that the default aggregation for the "ZIP CODE" field should not be a sum, but should rather be a count. The modified metadata 26 may then be persisted to the workbook 6 and published to the server computer 12A. In this manner, the server computer 12A can better respond to data source requests for data contained in this field. An illustrative user interface for editing the metadata 26 generated for the data objects in a workbook by the spreadsheet client application 4 will be described in greater detail below with respect to FIG. 4.

It should be appreciated that the server computers 12A-12C may include many of the conventional computing components illustrated in FIG. 2 and described above. Additionally, the server computer 12A may be operative to store and execute a spreadsheet server application 13. The file server computer 12C may be operative to store and execute a file server application 28 for receiving and responding to requests for files stored in the repository 14, such as a workbook 6. It should be appreciated that the server computers 12A-12C may include other conventional components not illustrated in FIG. 2 but known to those skilled in the art.

Figure 3:
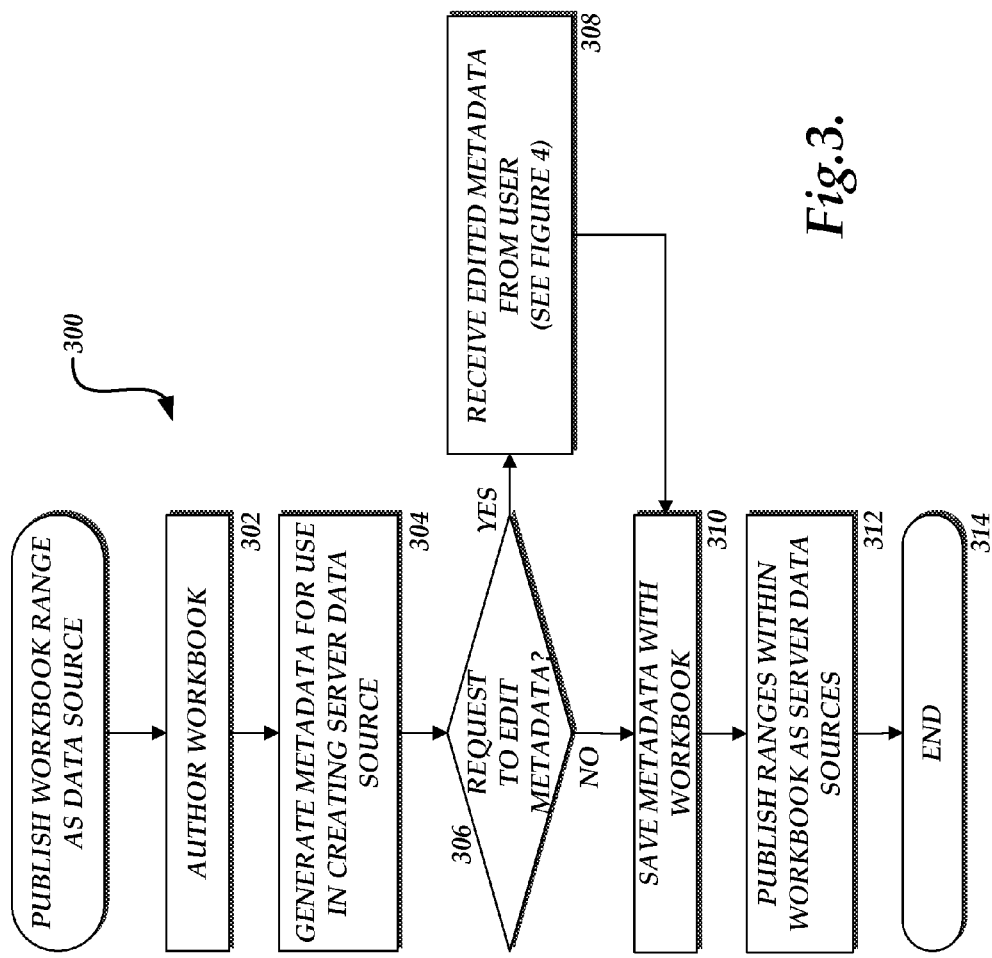
FIG. 3 is a flow diagram illustrating aspects of a process for publishing a workbook range as a server data source according to one embodiment of the invention.

Referring now to FIG. 3, an illustrative routine 300 will be described illustrating a process performed by the spreadsheet client application program 4 for publishing a workbook range as a server data source. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3 and 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where a user utilizes the spreadsheet client application 4 to author the workbook 6. In particular, as described herein, the user may utilize the various facilities provided by the spreadsheet client application 4 to create data objects within the workbook including ranges of cells, pivot tables, DOEs, lists, databases, query tables, and other data objects. The user also may manually enter data or create a query in the workbook 6 of a data source 16. The various functions and methodologies that may be utilized within a spreadsheet client application 4 to create a workbook 6 are virtually unlimited and well-known to those skilled in the art.

From operation 302, the routine 300 continues to operation 304, where the spreadsheet client application 4 generates the metadata 26 for use by the server application 13 in responding to requests to access the workbook 6 as a data source. In particular, the spreadsheet client application 4 may analyze the various data sources contained within the workbook 6 to identify data that may be utilized to describe the various data sources within the workbook 6. For instance, with respect to a relational data source, the spreadsheet client application 4 may identify the names of the columns and the various data types of the data sources contained with the workbook 6. With respect to multidimensional data sources, the spreadsheet client application 4 may identify measures, hierarchy, and default aggregations for the various data sources.

Values for these properties may also be set by the spreadsheet client application 4 in an intelligent manner. For instance, with respect to a string data field, the spreadsheet client application 4 may indicate the default aggregation as being a count. With regard to numeric data fields, the spreadsheet client application 4 may set the default aggregation to being a sum. Other types of intelligent decisions may be made by the spreadsheet client application 4 to identify metadata within the workbook 6 and to set properties for the metadata.

From operation 304, the routine 300 continues to operation 306, where the spreadsheet client application 4 determines whether a user has made a request to edit the metadata generated by the spreadsheet client application 4. As described briefly above, the spreadsheet client application 4 may provide a user interface for editing the generated metadata. This may be useful, for instance, to allow a user to override the intelligent decisions made by the spreadsheet client application 4 when identifying metadata within the workbook 6 and setting various properties on the metadata.

If, at operation 306, the spreadsheet client application 4 determines that a request to edit the metadata has been received, the routine 300 branches to operation 308. At operation 308, the spreadsheet client application 4 receives edited metadata from the user. An illustrative user interface for permitting a user to edit the metadata will be described in greater detail below with respect to FIG. 4. From operation 308, the routine 300 continues to operation 310.

If, at operation 306, the spreadsheet client application 4 determines that a request to edit the metadata has not been received, the routine 300 continues to operation 310. At operation 310, the metadata 26 generated by the spreadsheet client application 4, and potentially edited by the user, is saved with the workbook 6. Saving of the workbook 6 may occur automatically or may occur in response to a user request.

From operation 310, the routine 300 continues to operation 312, where the workbook 6, including the metadata 26, is published to the spreadsheet server application 13. Publication of the workbook 6 may occur in response to a user command or may occur automatically. For instance, publication of the workbook 6 may include uploading a spreadsheet to the server computer 12A or programmatically generating a spreadsheet and sending it to the server computer 12A through the server application program interface ("API"). When the workbook 6 is published to the spreadsheet server application 13, the workbook 6 is stored in the repository 14. The spreadsheet server application 13 is also notified of the existence of the workbook 6 and the various data objects contained with the workbook may then be exposed as server data sources. It should be appreciated that the user may be permitted to specify which of the various data objects within the workbook 6 are exposed by the spreadsheet server application 13 as data sources. Alternatively, all of the data objects within a workbook 6 may be exposed as data objects or a user may be permitted to indicate that no data objects within the workbook 6 are exposed as data sources.

Once the workbook 6 has been propagated to the repository 14 and analyzed by the spreadsheet server application 13, database client applications, such as the OLAP client application 8 or the spreadsheet client application 4, may be utilized to query the contents of the workbook 6 as a data source. Additional details regarding the various functions performed by the spreadsheet server application 13 in order to expose the contents of the workbook 6 as a data source and to receive and respond to data source query requests will be described in greater detail below with respect to FIG. 5. From operation 312, the routine 300 continues to operation 314, where it ends.

Figure 4:
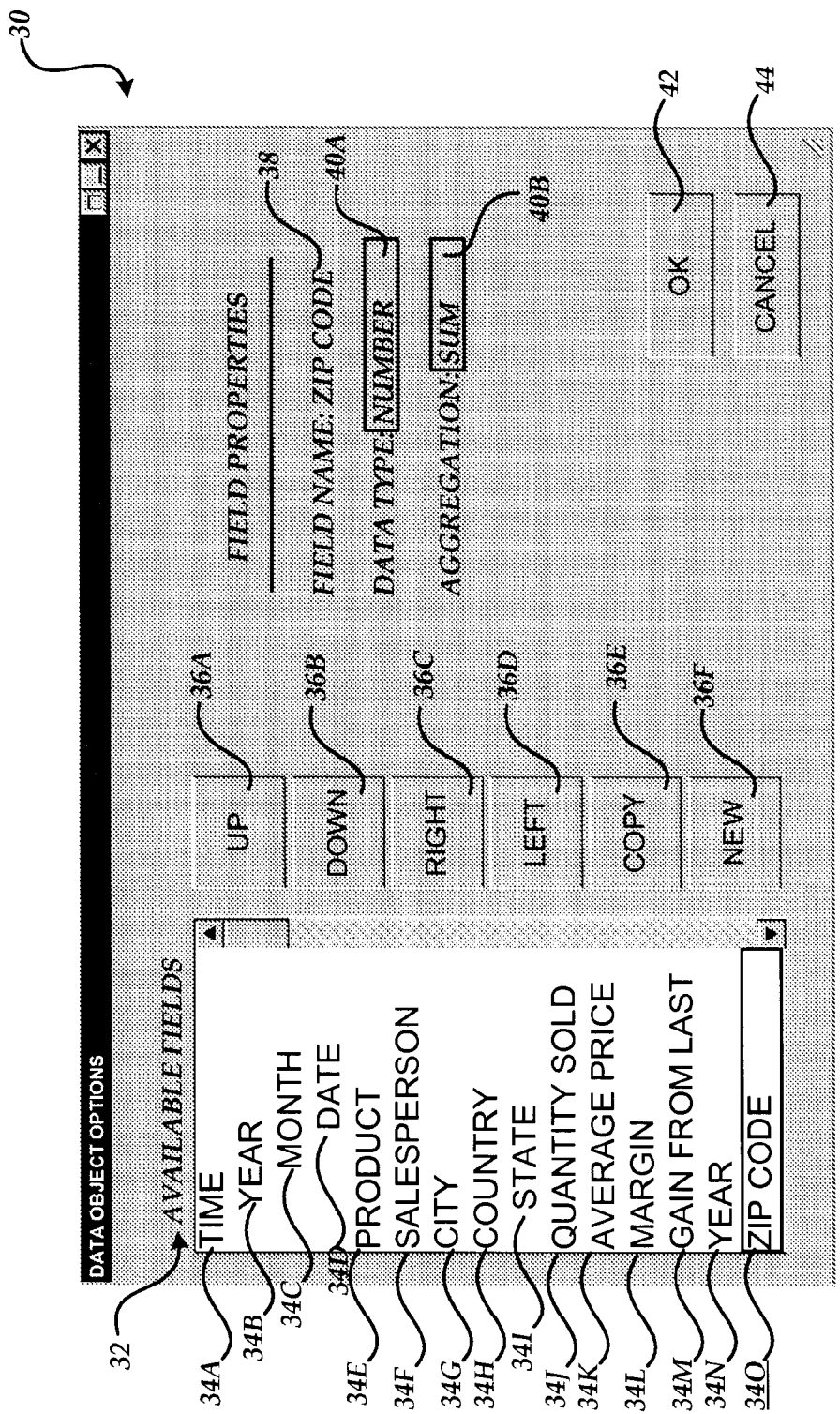
FIG. 4 is a screen diagram illustrating an aspect of the invention for providing a facility through which a user can edit metadata associated with data objects in a range of a workbook.

Referring now to FIG. 4, an illustrative user interface will be described for allowing a user to edit the metadata generated by the spreadsheet client application 4 for the various data sources contained within a workbook 6. FIG. 4 shows a user interface window 30 including a number of user interface components for editing the metadata. In particular, a list box 32 is provided that lists each of the available fields 34A-34O for the data sources contained in the workbook 6. Relationships between the various fields 34A-34O may be illustrated within the list box 32 to indicate the relationships between the various fields identified by the spreadsheet client application 4. For instance, as shown in FIG. 4, the time, year, month, and date fields may be indented from one another to indicate the hierarchy among the various fields.

Several user interface buttons 36A-36F may also be provided to allow the user to arrange the order and hierarchy of the fields 34A-34O shown in the list box 32. For instance, the user interface buttons 36A-36D, allow the user to arrange the various fields up, down, right, or left, respectively. User interface button 36E may be utilized to copy one of the fields 34A-34O and the user interface button 36F may be utilized to create a new data field.

As also shown in FIG. 4, one of the fields identified in the list box 32 may be selected by a user and the properties for the field may be shown in the user interface window 30. For instance, as shown in FIG. 4, the field 34O representing a zip code has been selected. Accordingly, the field name is displayed utilizing text 38. The data type and aggregation assigned to the zip code field by the spreadsheet client application 4 are also shown. A dropdown menu 40A may be provided for changing the properties of the data type from a number to a string, for instance. Similarly, a dropdown menu 40B may be provided for allowing a user to change the value of the aggregation field from a sum to a count. It should be appreciated that other types of editing operations may be permitted through the user interface window 30 other than those illustrated in FIG. 4 and described herein. When a user has completed editing, the button 42 may be selected to persist the modifications or the button 44 may be selected to cancel the changes.

Figure 5:
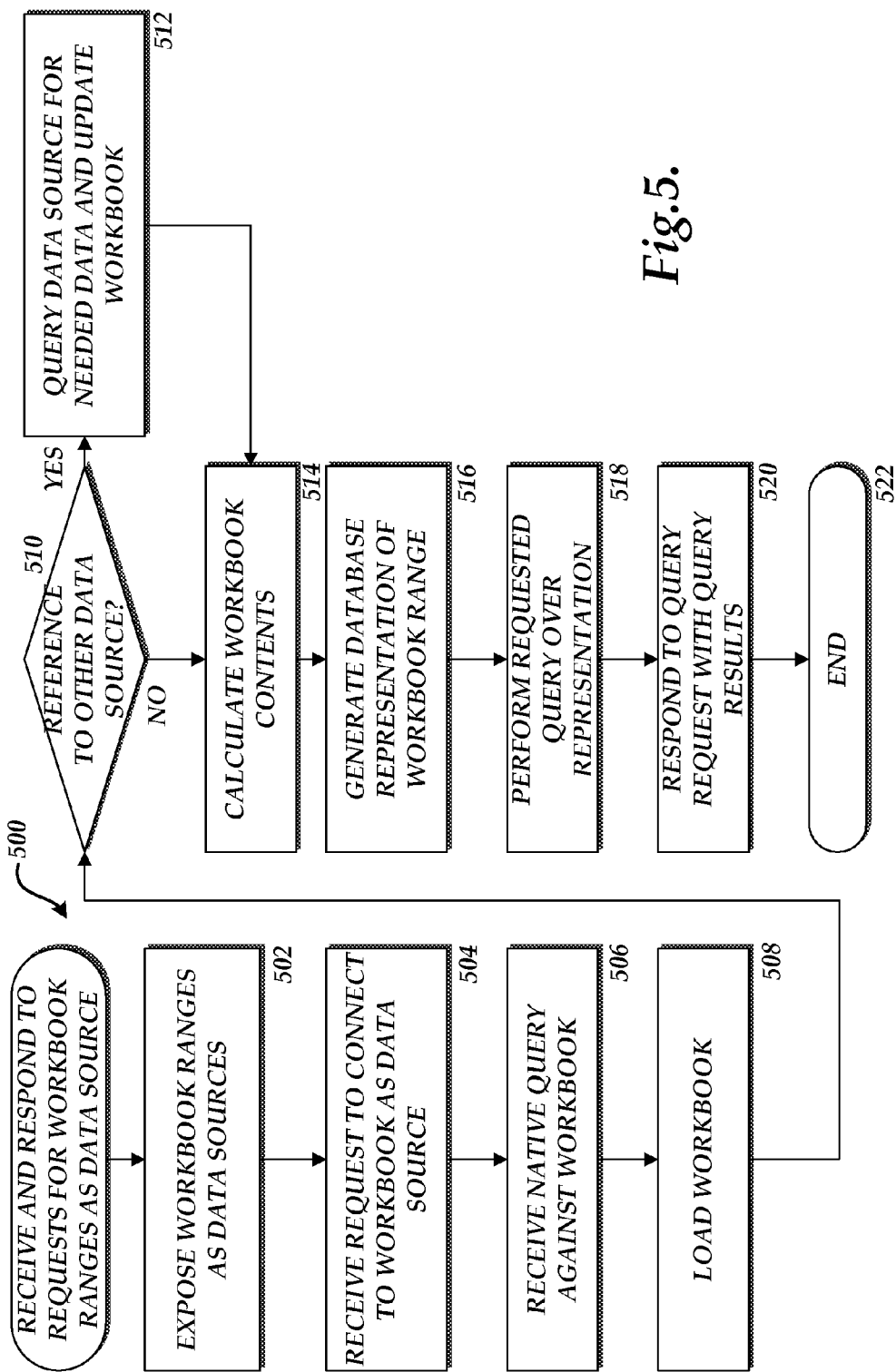
FIG. 5 is a flow diagram illustrating aspects of a process for receiving and responding to requests for workbook ranges as server data sources according to one embodiment of the invention.

Turning now to FIG. 5, an illustrative routine 500 will be described illustrating the operation of the spreadsheet server application 13 for receiving and responding to requests for workbook ranges as data sources. The routine 500 begins at operation 502, where the spreadsheet server application 13 exposes the various ranges of workbooks contained within the repository 14 as server data sources. According to one embodiment of the invention, the data sources are exposed through a data connection manager such as the one described in the concurrently filed United States patent application Ser. No. 10/858,190 entitled "Method, System, and Apparatus for Discovering and Connecting to Data Sources" which is expressly incorporated herein by reference. . Alternatively, the data sources contained within the workbook stored within the repository 14 may be exposed utilizing other types of analysis server interfaces, such as UDM. Once the spreadsheet server application 13 has exposed the various data sources, a client application such as the OLAP client application 8 or the spreadsheet client application 4 may discover sources and issue requests querying the various data sources.

The routine 500 continues from operation 502 to operation 504, where the spreadsheet server application 13 receives a request to connect to a workbook as a server data source. For instance, at operation 506, a spreadsheet server application 13 may receive a native query against a data object contained within a range of a workbook. For instance, the OLAP client application may issue a native OLAP query to the spreadsheet server application 13. Alternatively, other types of queries may be issued to the spreadsheet server application 13 such as ODB, ODBC, XML-A, and SQL queries. Other types of standards for querying a database known to those skilled in the art may also be utilized.

At operation 508, the spreadsheet server application 13 loads the workbook 6 containing the data source to which a query has been directed. Once the workbook 6 has been loaded by the spreadsheet server application 13, the routine 500 continues to operation 510, where the spreadsheet server application 13 determines whether the workbook 6 includes a reference to another data source. For instance, as described briefly above, the workbook may include a reference to a data source, such as the data source 16.

If the workbook 6 includes a reference to another data source, the routine 500 branches to operation 512, where the spreadsheet server application 13 queries the data source 16 for any data needed to calculate the workbook 6. Once this data is received by the spreadsheet server application 13, the workbook 6 is updated with the received data.

If, at operation 510, it is determined that the workbook 6 does not include a reference to another data source, the routine 500 continues to operation 514. At operation 514, the spreadsheet server application 13 recalculates the contents of the workbook 6. It will be appreciated that the recalculation of the contents of the workbook may be a "big value-add." A "big value-add" enables spreadsheet calculations in a server data source. From operation 514, the routine 500 continues to operation 516, where the spreadsheet server application 13 generates a database representation of the recalculated workbook. In particular, a temporary database representation, such as a relational database or OLAP cube, is generated by the spreadsheet server application 13. The database representation is generated temporarily in order to perform the requested query over the identified data source.

Once the database representation of the requested workbook has been generated, the routine 500 continues to operation 518, where the spreadsheet server application 13 performs the requested query on the database representation of the recalculated workbook. In response to performing the query, a query result is generated that satisfies the initial query received from the client application. From operation 518, the routine 500 continues to operation 520, where the spreadsheet server application 13 responds to the original query request with the identified query result. From operation 520, the routine 500 continues to operation 522, where it ends.

Based on the foregoing, it should be appreciated that the various embodiments of the invention include a method, system, apparatus, and computer-readable medium for exposing and utilizing ranges within a workbook as server data sources. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for exposing data objects of a workbook as a server data source, comprising:
    generating metadata for the data objects by automatically identifying the metadata in the workbook and setting properties for the identified metadata, wherein the metadata is utilized by a first server computer in responding to requests for the data objects stored in the workbook as a server data source, the server data source comprising a multidimensional database, wherein identifying the metadata comprises analyzing the data objects to identify the following: data types, measures, hierarchy, and default aggregations, and wherein setting the properties comprises indicating a first default aggregation as a count for a string data field in the metadata and setting a second default aggregation as a sum for a numeric data field in the metadata;

publishing the workbook and the metadata to the first server computer, wherein publishing comprises programmatically generating a spreadsheet and sending the spreadsheet to the first server computer through a server application program interface, wherein the workbook is parsed for ranges including the data objects by a spreadsheet server application executing on the first server computer, and wherein user-specified data objects from among the data objects are exposed at the first server computer as server data sources; and connecting to the data object exposed at the first server computer as server data sources in a manner identical to connecting to a dedicated OLAP data source provided by a second server computer.

2. The method of claim 1, further comprising:

receiving a request from a user to edit the metadata for data objects; and in response to the request to edit the metadata, providing a facility for allowing a user to edit the metadata.

3. The method of claim 1, wherein the metadata is editable.

4. A method for exposing and utilizing data objects within a workbook as a server data source, comprising:

generating metadata for the data objects by automatically identifying the metadata in the workbook and setting properties for the identified metadata, wherein the metadata is utilized by a first server computer in responding to requests for the data objects stored in the workbook as a server data source, the server data source comprising a multidimensional database, wherein identifying the metadata comprises analyzing the data objects to identify the following: data types, measures, hierarchy, and default aggregations, and wherein setting the properties comprises indicating a first default aggregation as a count for a string field in the metadata and setting a second default aggregation as a sum for a numeric data field in the metadata;

publishing the workbook and the metadata to the first server computer, wherein the workbook is parsed for ranges including the data objects by a spreadsheet server application executing on the first server computer;

exposing the data objects as server data sources;

connecting to the data objects exposed at the first server computer as server data sources in a manner identical to connecting to a dedicated OLAP data source provided by a second server computer;

receiving a data source query at the first server computer referencing data contained within one of the data objects;

in response to receiving the data source query, loading the workbook and calculating the workbook, including calculating a value of the data objects;

generating a temporary database representation of the data objects utilizing the metadata, wherein the temporary database representation comprises an OLAP cube;

performing the data source query on the database representation of the data objects to create a query result; and responding to the query with the query result.

5. The method of claim 4, further comprising prior to calculating the workbook:

determining whether the workbook contains a reference to a data source;

in response to determining that that the workbook contains a reference to a data source, retrieving data from the data source necessary to calculate the workbook; and calculating the workbook, including calculating the value of the data objects in view of the data retrieved from the data source.

6. A system for exposing and utilizing data objects within a workbook as a server data source, the system comprising:

a client computer configured to execute a spreadsheet application program for authoring a workbook having data objects, wherein the spreadsheet application program generates metadata utilized by a server application and publishes the workbook to a first server computer, wherein publishing comprises programmatically generating a spreadsheet, wherein the spreadsheet application program is further configured to generate metadata for the data objects by automatically identifying the metadata in the workbook and setting properties for the identified metadata, wherein the metadata is utilized by a server computer in responding to requests for the data objects stored in the workbook as a server data source, the server data source comprising a multidimensional database, wherein identifying the metadata comprising analyzing the data objects to identify the following: data types, measures, hierarchy, and default aggregations, wherein setting the properties comprises indicating a first default aggregation as a count for the string data field in the metadata and setting a second default aggregation as a sum for a numeric data field in the metadata, wherein the spreadsheet application is further configured to connect to the data objects exposed at the first server computer as server data sources in a manner identical to connecting to a dedicated OLAP data source provided by a second server computer; and the first server computer configured to receive the spreadsheet from the client computer through a server application program interface, to parse the workbook for ranges including the data objects, and to execute a server program for exposing user specified objects from among the data objects contained in the workbook as server data sources and for receiving and responding to query requests directed to the server data sources.

7. The system of claim 6, wherein the spreadsheet application program is further configured to provide a facility for allowing a user to edit the metadata.

8. The system of claim 7, further comprising a second client computer configured to execute an application program for issuing queries against a server data source, and wherein the server program is further configured to receive and respond to a database query from the second client computer to the sewer data source.

9. The system of claim 8, wherein responding to a database query from the second client computer comprises:

recalculating the workbook;

generating a temporary database representation of the recalculated workbook, wherein the temporary database representation comprises an OLAP cube;

performing the database query on the database representation of the recalculated workbook to obtain a query result; and transmitting the query result to the second client computer as a response to the database query.

10. The system of claim 9, wherein responding to a database query from the second client computer further comprises:
   determining whether the workbook contains a reference to a data source;
   in response to determining that the workbook contains a reference to a data source, retrieving from the data source the data necessary to calculate the workbook; and
   recalculating the workbook utilizing the data retrieved from the data source.

11. The system of claim 10, wherein the application executing on the second client computer comprises an OLAP client application.

* * * * *